Figure 1:
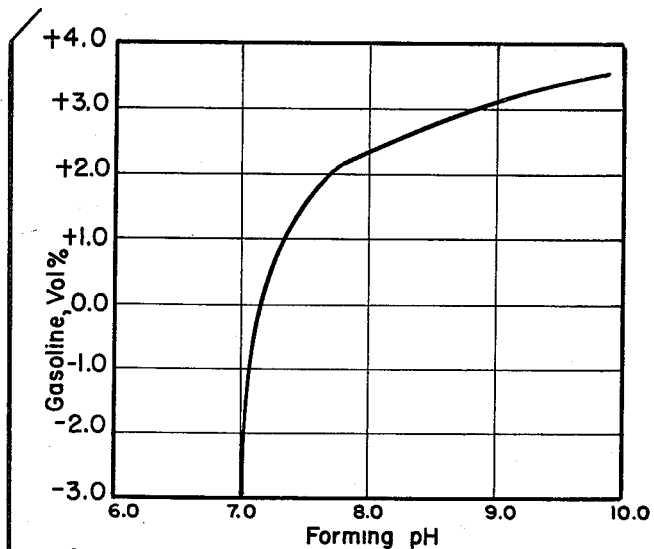

July 6, 1965    C. J. PLANK ETAL    3,193,492
SILICA-ZIRCONIA CATALYST AND METHOD FOR PREPARING THE SAME
Filed Oct. 25, 1962

INVENTOR.
Charles J. Plank
Edward J. Rosinski
Robert B. Smith
BY
Raymond W. Barclay
ATTORNEY

United States Patent Office 3,193,492
Patented July 6, 1965

3,193,492
SILICA-ZIRCONIA CATALYST AND METHOD FOR PREPARING THE SAME
Charles J. Plank, Woodbury, Edward J. Rosinski, Almonesson, and Robert B. Smith, Pitman, N.J., assignors to Socony Mobil Oil Company, Inc., a corporation of New York
Filed Oct. 25, 1962, Ser. No. 233,161
13 Claims. (Cl. 208—119)

This application is a continuation-in-part of copending applicaton Serial No. 843,808, filed October 1, 1959, now abandoned.

This invention relates to the catalytic conversion of hydrocarbons and to an improved catalyst for effecting said conversion. More specifically, the invention relates to the catalytic cracking of hydrocarbon oils in the presence of a new and improved catalyst. In one embodiment, the invention is concerned with an improved silica-zirconia cracking catalyst characterized by unusual selectivity and activity in the conversion of hydrocarbons. In another embodiment, the invention is directed to an improved method for preparing silica-zirconia composites of such characteristics useful in catalytic cracking of heavy petroleum fractions to lighter materials boiling in the gasoline range.

As is well known, there are numerous materials, both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory it is subject to improvement, particularly as regard to the selectivity and activity desirable in a present day cracking catalyst.

It has heretofore been known to produce catalytic composites of silica and zirconia in accordance with various methods. Thus, it has been proposed to prepare silica-zirconia catalysts by impregnation of silica gel with zirconum nitrate and to subsequently decompose the metal salt to zirconia. Molded mixtures of silica and zirconia precipitates have also been suggested as hydrocarbon conversion catalysts. While the results obtained utilizing such catalysts have indicated that composites of silica and zirconia are useful in catalytically promoting the conversion of hydrocarbons, the activity of the catalysts prepared by the foregoing methods has not been of significant commercial interest as compared with available silica-alumina hydrocarbon conversion catalysts as to constitute any appreciable improvement over the latter. Accordingly, the industry has continued to use as petroleum cracking catalysts, composites of silica and alumina.

The present invention affords a commercially attractive silica-zirconia catalyst characterized by outstanding selectivity and activity in the conversion of hydrocarbons. The improvement arises from the method of manufacture which comprises a particular combination of procedural steps including the reaction of a water-soluble zirconium compound and an alkali metal silicate in such proportion as to yield a hydrous oxide composite having a zirconia content, on a dry solids basis, of between about 2 and about 20 percent by weight and a pH in excess of 7.5 and thereafter activating the composite produced in an atmosphere of controlled moisture content under essentially non-drying conditions at a temperature between about 170° F. and about 220° F. for ½ hour to 8 hours. Zeolitic impurities, if any, may be removed from the composite before or after the aforementioned activation step. The composite is then washed free of water-soluble matter, dried and calcined. In the foregoing procedure, it has been found that the activation step of treating the silica-zirconia composite in an atmosphere of controlled moisture under the specified conditions and control of pH during formation are essential in achieving the unusually effective selectivity and activity characterizing the present silica-zirconia catalyst.

In one embodiment, the invention provides for the manufacture of a silica-zirconia catalyst by reacting a water-soluble zirconium compound and an alkali metal silicate in such proportion as to yield a gelable hydrosol having a zirconia content, on a dry solids basis, of between about 2 and about 20 percent by weight and a pH in excess of 7.5, permitting the resulting sol to set forming a silica-zirconia hydrogel and thereafter activating the same in an atmosphere of controlled moisture content under essentially non-drying conditions at a temperature between about 170° F. and about 220° F. for ½ hour to 8 hours, under conditions of substantially atmospheric pressure. Zeolitic impurities, if any, are removed from the hydrogel which is then washed free of water-soluble matter, dried and calcined. The pH of gel formation is essentially above 7.5, i.e. alkaline, permitting the attainment of silica-zirconia gels characterized by particularly favorable gel properties as well as by a short time of set, i.e. generally less than 2 hours and more particularly less than 20 seconds. The temperature of the activation treatment involving the use of an atmosphere of controlled moisture content is generally within the approximate range of 170 to 220° F. The time required for activation is generally at least ½ hour and may extend up to about 8 hours. Preferably the activation period is within the approximate range of ½ hour to 3 hours.

In some instances it has been found desirable to reduce the pH of the hydrogel prior to the aforementioned activation treatment in an atmosphere of controlled moisture content. Such reduction in pH apparently serves to solubilize the zirconia and to enhance the subsequent activation. Employing such technique the hydrogel is contacted with an acidic fluid with 24 hours after formation. It is generally desirable when such step is carried out to reduce the pH of the silica-zirconia hydrogel within a period of two hours after formation to below that at which the hydrogel is produced and generally below 7. Utilizing this technique, the hydrogel is contacted with an aqueous solution of an acid or an acidic salt of sufficient concentration to effectively reduce the hydrogel pH to less than 7. Usually, an inorganic acid and particularly a dilute solution of a mineral acid such as nitric, hydrochloric or sulfuric acid or an ammonium salt of such acid in the form of a 0.1 to 10 weight percent solution is employed for this purpose.

The zirconium compound employed in the present process is a water-soluble compound and suitably a water-soluble mineral acid salt of zirconium such as, for example, zirconium nitrate, zirconium sulfate and zirconyl chloride. Of this group, zirconium sulfate is accorded preference, since under comparable conditions of formation, catalysts prepared using this salt showed the greatest improvement in activity and selectivity. Zircon sand is a suitable source of zirconium compound. The zirconia content of such sand can be converted to zirconium sulfate through caustic fusion at temperatures exceeding 1000° F. and subsequent leaching with sulfuric acid.

The silicate reactant is generally an alkali metal silicate and particularly sodium silicate, although silicates of the other alkali metals, such as, for example, potassium silicate might likewise be employed. An organic silicate ester, for example ethyl ortho silicate, may also be employed, as the source of silica.

The solutions of zirconium compound and silicate reactant are intimately mixed in such proportions as to yield a gelable sol having a zirconia content, on a dry, i.e. water-free basis, of between about 2 and about 20 and preferably between about 5 and about 15 percent by weight and a pH of above 7.5 and generally not exceeding about 11.

The resulting product is a hydrosol of silica and zirconia characterized by an inherent capacity to set to a hydrogel upon lapse of a suitable interval of time extending from a few seconds up to several hours depending upon pH, temperature and solids concentration without addition to or subtraction from the hydrosol of any substance. By following the teachings of this invention, the time of gelation can be very rapid, i.e. less than 20 seconds which permits the gel to be prepared directly in the form of spheroidal particles resulting in a product of improved physical properties and definite economic advantages in the manufacture of the catalyst. In addition to affording rapid gelation, the high pH of gel formation has been found to be essential to afford a more selective catalyst as compared with a comparable gel in which the pH of formation is below 7.5.

The hydrogel so produced is activated by maintaining the same in contact with a moist atmosphere at a temperature in the approximate range of 170 to 220° F. and more particularly, between about 200 and 220° F. at substantially atmospheric pressure for a period of between about ½ hour and about 8 hours. This step is critical in achieving the improved silica-zirconia composite of this invention. In accordance with such step, the hydrogel is maintained in a heated amosphere in the presence of water vapor for a predetermined period. This can be readily accomplished by steaming the hydrogel for a required period or since the hydrogel itself contains substantial amount of water, the effects of activation can also be obtained by subjecting the wet hydrogel to a heated atmosphere and controlling conditions to maintain the hydrogel in the wet state, i.e. under substantially non-drying conditions, for the required activation time before actual drying takes place. It is generally preferred to effect activation by subjecting the hydrogel for a period of between about ½ hour and about 3 hours to a heated atmosphere in the presence of water such that the hydrogel is maintained under substantially non-drying conditions at a temperature within the approximate range of 170 to 220° F. Thus, activation may be effected by the use of 100 percent steam or hot air saturated with water vapor or air having a moisture content of at least about 60 percent relative humidity. The moisture content of the activating atmosphere is preferably between about 60 percent and about 80 percent relative humidity.

Either prior or subsequent to the activation treatment exchangeable or zeolitic impurities, if present, are removed from the hydrogel in any feasible manner. While, as a practical matter, all or a large proportion of such zeolitic impurities may be removed during the course of treatment under conditions of reduced pH when such step is employed, any remaining zeolitic matter is suitably removed by base-exchange with aqueous solutions of mineral acids such as hydrochloric and sulfuric acids; solutions of ammonium salts which act to replace metal impurities with ammonium which is later removed by calcining; and solutions of multivalent solutions, particularly a zirconium salt which may be the same or a different zirconium salt from that employed in initial formation of the hydrogel. When base-exchanging the silica-zirconia hydrogel with an acid, a limited and controlled amount must obviously be used to avoid redissolving the zirconia. When exchanging with ammonium compounds any excesses will be calcined out in the final steps of catalyst manufacture and when using any zirconium or other multivalent metal salt which does not adversely affect the catalytic properties, excesses may be used and left on the composite. If desired, after removal of zeolitic impurities the hydrogel may be washed free of soluble excess ions. The resulting catalytic composite of silica and zirconia is then completed by drying in air or superheated steam at a temperature between about 200 and 400° F. for a period of between about 4 and 24 hours and/or by calcining at a temperature between about 800 and about 1800° F. for approximately 2 to 12 hours or more.

The catalyst may be prepared in any desired suitable form according to the specific purpose for which it is intended. Either before or after calcination it can be broken into lumps or granules or it may be ground to a fine powder adapted for use in the suspensoid or fluidized-solids process. Alternatively, the catalyst can be formed into pills, pellets or other suitable shapes, preferably prior to the calcination step for use in fixed bed or compact moving bed operations. In this case, the catalytic mixture is partially dried, ground to a powder preferably smaller than 30 mesh (Tyler), combined with a suitable lubricant such as graphite, hydrogenated coconut oil, stearic acid, rosin or the like and shaped by extrusion, molding or other means known in the art. Particles having dimensions ranging from about ⅛″ x ⅛″ to ½″ x ½″ are generally satisfactory. The shaped particles can then be further dried and/or calcined as described above.

In one embodiment of the invention, the initially prepared hydrosol is introduced in the form of globules to a water-immiscible fluid such as into a column of water-immiscible liquid, for example, an oil medium wherein the globules of hydrosol set to spheroidal bead-like particles of hydrogel. Larger size spheres are ordinarily within the range of from about 1/64 to about ½ inch in diameter whereas smaller size spheres which are generally referred to as microspheres are within the range of from about 20 to about 200 microns in diameter. The use of spherically shaped gel particles is of particular advantage in hydrocarbon conversion processes including the moving catalyst bed process, the fluidized process and other processes in which the spheroidal silica-zirconia cracking catalyst particles are subjected to continuous movement. As applied to the stationary bed, spheroidal gel catalyst particles provide effective contact between the reactants and the catalyst by avoiding channeling.

The resulting improved silica-zirconia catalyst is useful in numerous processes for the conversion of hydrocarbons. It has been found, for example, to be highly effective in the cracking of heavy petroleum oils, such as gas oils, heavy naphthas and the like to lighter materials boiling in the gasoline range at conventional catalytic cracking conditions including temperatures in the range of about 700° F. to 1100° F. and pressure ordinarily between 1 and 5 atmospheres absolute. The present catalyst is also suitable for use in various other hydrocarbon conversion reactions.

The following examples will serve to illustrate the invention hereinabove described without limiting the same:

EXAMPLE 1

A silica-zirconia catalyst was produced from the following reactants:

Solution A which consisted of 2800 cc. of "N" brand sodium silicate (0.193 gram $SiO_2$/cc.) diluted with 4800 cc. of water.

Solution B which was prepared by adding 1200 cc. of $Zr(SO_4)_2 \cdot 4H_2O$ solution containing 0.05 g. $ZrO_2$/cc. and 72 cc. of concentrated $H_2SO_4$ (96.1 weight percent) to 1128 cc. of water.

Solutions A and B were rapidly mixed with agitation. The resulting hydrogel had a pH of 6.0 and gelled in 3 minutes at a temperature of 42° F.

The resulting hydrogel was immediately cut into cubes and added to a 2 percent aqueous sulfuric acid solution, one-half volume of solution being used per volume of gel. The hydrogel was aged in this solution for 24 hours at room temperature, reducing the gel pH from 6.0 to 1.7. The hydrogel cubes were then drained free of sulfuric acid solution and then activated in a steam atmosphere having a moisture content of about 67 percent relative humidity at a temperature of 220° F. for 2 hours. The activated hydrogel was then dried for 16 hours at a temperature in the approximate range of 240° to 270° F. in a circulated air dryer. The dried gel was then saturated with steam and base-exchanged seven times at two hour intervals and finally overnight with a 2 percent by weight aqueous solution of ammonium chloride. The gel was then washed free of chloride ion, dried 2 hours at 270° F. in air, calcined 10 hours at 1000° F. in air. The resultant gel product contained approximately 10 percent $ZrO_2$ and 90 percent $SiO_2$.

EXAMPLES 2–5

Silica-zirconia catalysts were prepared in the manner of Example 1 except that the amount of sulfuric acid employed in the acid-zirconium sulfate reactant solution was reduced to form silica-zirconia hydrogels at a pH of 7.0, 7.5, 8.5 and 9.9 respectively. These gels were processed and activated in a manner identical with that described above in Example 1.

Cracking characteristics of the above catalysts of Examples 1, 2, 3, 4 and 5 were determined upon subjecting each of the catalysts to the CAT-C test. In this test, a wide range Mid-Continent gas oil boiling initially from 450° F. to 95 percent at 950° F. is passed over the catalyst sample at a standard set of conditions involving a liquid hourly space velocity of 2, a catalyst to oil ratio of 3, and a temperature of 900° F. to observe selectivity differences independent of the conversion level of the individual silica-zirconia catalyst samples, each catalyst is compared to a standard commercial silica-alumina cracking catalyst containing about 10 weight percent alumina and 90 weight percent silica giving the same conversion as the appropriate silica-zirconia catalyst. The results for Examples 1 to 5 are set forth in Table I. In this comparison each of the catalysts was treated with 100 percent steam at atmospheric pressure for 20 hours at 1225° F. before the cracking test to bring the activity to a reproducible level. Physical and chemical properties of the above catalysts are also set forth in Table I.

*Table I*

| Example No. | 1 | 2 | 3 | 4 | 5 |
|---|---|---|---|---|---|
| Forming pH | 6.0 | 7.0 | 7.5 | 8.5 | 9.9 |

| PHYSICAL AND CHEMICAL PROPERTIES | | | | | |
|---|---|---|---|---|---|
| $ZrO_2$, percent wt | 9.3 | 9.4 | 9.4 | 9.6 | 9.3 |
| $SO_4$, percent wt | 1.5 | 0.21 | 0.15 | 0.21 | 0.19 |
| Na, percent wt | <.05 | 0.06 | <0.05 | <0.05 | <0.05 |
| Surface area, m.²/g.: | | | | | |
|   Fresh | 327 | 400 | 420 | 395 | 476 |
|   Steamed [1] | 79 | 208 | 252 | 228 | 239 |
| Apparent density, g./cc.: | | | | | |
|   Steamed [1] | 1.19 | 1.0 | 1.0 | 1.0 | 0.95 |

| CAT-C EVALUATION OF STEAMED [1] CATALYSTS | | | | | |
|---|---|---|---|---|---|
| Conversion, vol. percent | <10 | 40.4 | 48.7 | 48.8 | 51.9 |
| Gasoline, vol. percent | <10 | 31.6 | 41.4 | 42.2 | 44.8 |

| DIFFERENCE FROM $SiO_2$-$Al_2O_3$ AT SAME CONVERSION | | | | | |
|---|---|---|---|---|---|
| Gasoline, vol. percent | | −2.8 | +1.9 | +2.7 | +3.6 |
| Coke, wt. percent | | +1.6 | +1.2 | +0.8 | +0.1 |

[1] Steamed 20 hours at 1,225° F. with 100% steam at atmospheric pressure.

Figure 2:
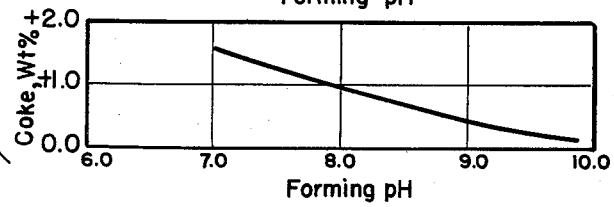
Figure 3:
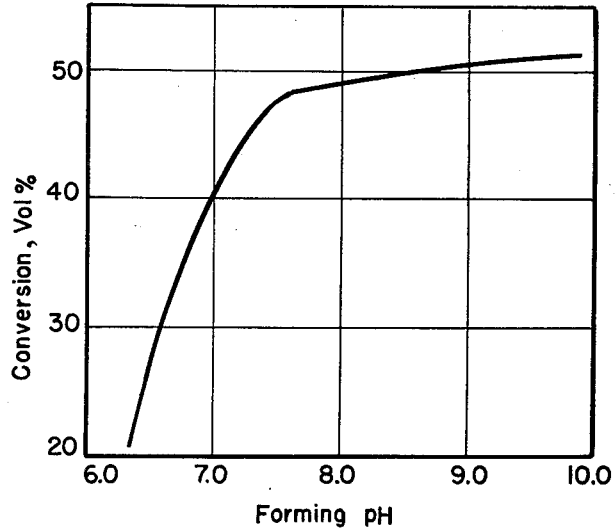

From the above data it will be seen that it is necessary to form the silica-zirconia catalysts above a pH of 7.5 when employing the described method of activation. It will be seen that the catalyst of Example 1 formed at a pH of 6.0 had, after steaming, an exceedingly low surface area. This catalyst furthermore was characterized by a very poor activity. It will further be seen from the above data that the CAT-C activity increased as the pH of formation was increased. Thus, the catalyst formed at 6.0 pH had a poor activity while the catalyst formed at 7.0 pH showed 40 percent conversion which increased to 48 percent for the 7.5 and 8.5 pH catalysts and 51.9 percent for the 9.9 pH catalyst. The latter catalysts, moreover, showed an improved yield of gasoline as compared with a commercial silica-alumina catalyst at the same conversion. The marked improvement in volume percent conversion as well as the reduced coke and improved gasoline yield over silica-alumina catalyst is evident from FIGURES 1–3 of the attached drawing in which the data of Table I are presented graphically. Such drawing, particularly, points up the fact that the pH of gel formation in preparation of the present silica-zirconia catalysts should be at least 7.5.

The above data show that active and selective silica-zirconia cracking catalysts can be prepared in accordance with the method described herein. Thus, the silica-zirconia catalysts prepared in accordance with the present method show definitely better selectivity to gasoline than silica-alumina cracking catalysts at the same conversion.

EXAMPLE 6

The silica-zirconia composite utilized in preparation of the catalyst of this example and that of Examples 7–11 was prepared by mixing a sodium silicate solution with an acid zirconium sulfate solution continuously through a mixing nozzle.

The compositions of the solutions were as follows:

(A) Silicate solution:
  21.4 lbs. "N" brand sodium silicate
    (28.9 wt. percent $SiO_2$)
  14.3 lbs. water
  Specific gravity=1.204 at 76° F.

(B) Acid zirconium sulfate solution:
  2.91 lbs. $Zr(SO_4)_2 \cdot 4H_2O$
  36.8 lbs. water
  1.48 lbs. $H_2SO_4$ (97 percent)
  Specific gravity=1.069 at 78° F.

The above solutions were intimately mixed in a mixing nozzle, adding 284 cc. per minute of silicate solution at 30° F. to 292 cc. per minute of acid zirconium sulfate solution at 40° F. forming a silica-zirconia hydrosol having a pH of 8.0. The hydrosol was introduced in the form of globules into a body of water-immiscible liquid wherein the hydrosol globules set to firm hydrogel beads in 3 seconds at 51° F.

To one portion of the resulting bead hydrogel was added a 2 percent aqueous sulfuric acid solution, one-half volume of solution being used per volume of gel. The hydrogel was aged in this solution for 24 hours at room temperature, reducing the gel pH from 8.0 to about 2.9. The hydrogel beads were then drained free of sulfuric acid solution and then activated in a steam atmosphere having a moisture content of about 67 percent relative humidity at a temperature of 220° F. for 2 hours. The gel beads were then base-exchanged with a 2 percent by weight aqueous solution of ammonium chloride employing eight contacts of two hours each. The gel was then washed free of chloride ion, dried 2 hours at 270° F. in air and calcined 10 hours at 1000° F. in air. The resultant gel product contained approximately 10.5 percent $ZrO_2$ and 89.5 percent $SiO_2$.

EXAMPLE 7

To another portion of the silica-zirconia bead hydrogel prepared as in Example 6 was added a 5 percent aqueous ammonium chloride solution, one-half volume of solution being used per volume of gel. The hydrogel was aged in this solution for 24 hours at room temperature. The pH of the gel was not appreciably affected during such aging. The hydrogel beads were then drained free of ammonium chloride solution and then activated in a steam atmosphere having a moisture content of about 67 percent relative humidity at a temperature of 220° F. for 2 hours. The activated hydrogel was then base-exchanged, washed, dried, and calcined as in Example 6. The resultant gel product contained approximately 11.5 percent $ZrO_2$ and 88.5 percent $SiO_2$.

EXAMPLE 8

To a third portion of the silica-zirconia bead hydrogel prepared as in Example 6 was added a 1 percent aqueous sulfuric acid solution, one-half volume of solution being used per volume of gel. The hydrogel was aged in this solution for 24 hors at room temperature, reducing the gel pH from 8.0 to approximately 4.5. The hydrogel beads were then drained free of sulfuric acid solution and then activated in a steam atmosphere having a moisture content of about 67 percent relative humidity at a temperature of 220° F. for 2 hours. The activated hydrogel was then base-exchanged, washed, dried and calcined as in Example 6. The resultant gel product contained approximately 10.7 percent $ZrO_2$ and 89.3 percent $SiO_2$.

EXAMPLE 9

To a fourth portion of the silica-zirconia bead hydrogel prepared as in Example 6 was added a 0.5 percent aqueous sulfuric acid solution, one-half volume of solution being used per volume of gel. The hydrogel was aged in this solution for 24 hours at room temperature, reducing the gel pH from 8.0 to approximately 7.5. The hydrogel beads were then drained free of sulfuric acid solution and then activated in a steam atmosphere having a moisture content of about 67 percent relative humidity at a temperature of 200° F. for 2 hours. The activated hydrogel was then base-exchanged, washed, dried and calcined as in Example 6. The resultant gel product contained approximately 11.3 percent $ZrO_2$ and 88.7 percent $SiO_2$.

EXAMPLE 10

To a fifth portion of the silica-zirconia bead hydrogel prepared as in Example 6 was added a 0.25 percent aqueous sulfuric acid solution, one-half volume of solution being used per volume of gel. The hydrogel was aged in this solution for 24 hours at room temperature. The pH of the gel was not appreciably affected during such aging. The hydrogel beads were then drained free of sulfuric acid solution and then activated in a steam atmosphere having a moisture content of about 67 percent relative humidity at a temperature of 220° F. for 2 hours. The activated hydrogel was then dried, base-exchanged, washed and calcined as in Example 6. The resultant gel product contained approximately 10.9 percent $ZrO_2$ and 89.1 percent $SiO_2$.

EXAMPLE 11

To another portion of the silica-zirconia hydrogel prepared as in Example 6 was added a 1.5 percent aqueous sulfuric acid solution, one-half volume of solution being used per volume of gel. The hydrogel was aged in this solution for 24 hours at room temperature, reducing the gel pH from 8.0 to approximately 2.8. The hydrogel beads were then drained free of sulfuric acid solution and then activated in a steam atmosphere having a moisture content of about 67 percent relative humidity at a temperature of 220° F. for 2 hours. The activated hydrogel was then base-exchanged, washed, dried, and calcined as in Example 6. The resultant gel product contained approximately 11.5 percent $ZrO_2$ and 88.5 percent $SiO_2$.

Cracking characteristics of the above catalysts of Examples 6–11 were determined upon subjecting each of the catalysts to the above described CAT-C test. To observe selectivity differences independent of the conversion level of the individual silica-zirconia catalyst samples, each catalyst is compared to a standard commercial silica-alumina catalyst containing about 10 weight percent alumina and 90 weight percent silica, giving the same conversion as the appropriate silica-zirconia catalyst. The results for Examples 6–11 are set forth in Table II. In this comparison each of the catalysts was treated with 100 percent steam at atmospheric pressure for 20 hours at 1225° F. before the cracking test to bring the activity to a reproducible level.

Table II

| Example No. | 6 | 7 | 8 | 9 | 10 | 11 |
|---|---|---|---|---|---|---|
| Conversion, vol. percent | 51.0 | 52.1 | 52.5 | 49.6 | 43.3 | 52.7 |
| 10 RVP gaso., vol. percent | 41.8 | 45.6 | 43.7 | 43.2 | 39.0 | 44.1 |
| Excess $C_4$'s, vol. percent | 8.9 | 9.1 | 9.6 | 7.8 | 5.7 | 9.6 |
| $C_5+$ gasoline, vol. percent | 39.8 | 43.1 | 41.6 | 40.7 | 36.5 | 41.9 |
| Total $C_4$'s, vol. percent | 11.0 | 11.7 | 11.7 | 10.3 | 8.2 | 11.8 |
| Dry gas, wt. percent | 6.1 | 5.3 | 5.9 | 4.9 | 4.2 | 5.6 |
| Coke, wt. percent | 3.4 | 1.7 | 3.1 | 2.5 | 2.0 | 3.2 |
| Difference from $SiO_2$-$Al_2O_3$ at same conversion: | | | | | | |
| 10 RVP, gaso., vol. percent | +1.7 | +4.8 | +2.7 | +3.8 | +3.2 | +3.1 |
| Excess $C_4$'s, vol. percent | −1.9 | −2.0 | −1.8 | −2.6 | −3.0 | −1.8 |
| $C_5+$ gasoline, vol. percent | +1.9 | +4.6 | +2.9 | +3.7 | +3.0 | +3.2 |
| Total $C_4$'s, vol. percent | −2.1 | −1.7 | −1.9 | −2.4 | −2.8 | −1.9 |
| Dry gas, wt. percent | −0.1 | −1.0 | −0.5 | −1.0 | −0.7 | −0.8 |
| Coke, wt. percent | +0.4 | −1.5 | −0.2 | −0.3 | −0.1 | −0.1 |

The above data show that active and selective silica-zirconia cracking catalysts can be prepared in accordance with the method described herein. Thus, the silica-zirconia catalysts prepared in accordance with the present method show definitely better selectivity to gasoline than silica-alumina cracking catalysts at the same conversion.

EXAMPLE 12

The catalyst of this example showed that it is unnecessary to reduce the pH of the hydrogel as formed prior to the humidity activation treatment.

The silica-zirconia composite utilized in preparation of the catalyst of this example and that of Examples 13 and 14 was prepared by mixing a sodium silicate solution with an acid zirconium sulfate solution continuously through a mixing nozzle.

The compositions of the solutions were as follows:
(A) Silicate solution:
  13.9 lbs. "N" Brand sodium silicate (28.9 wt. percent $SiO_2$)
  9.3 lbs. water
  Specific gravity=1.20 at 82° F.
(B) Acid zirconium sulfate solution:
  1.89 lbs. $Zr(SO_4)_2 \cdot 4H_2O$
  23.9 lbs. water
  1.48 lbs. $H_2SO_4$ (97 percent)
  Specific gravity=1.080 at 88° F.

The above solutions were intimately mixed in a mixing nozzle, adding 440 cc. per minute of silicate solution at 55° F. with 386 cc. per minute of acid zirconium sulfate solution at 43° F. forming a silica-zirconia hydrosol having a pH of 8.0. The hydrosol was introduced in the form of globules into a body of water-immiscible liquid wherein the hydrosol globules set to firm hydrogel beads in 2.4 seconds at 77° F. The composition of the silica-zirconia composite at this point was 90.8 weight percent $SiO_2$ and 9.2 weight percent $ZrO_2$.

A 1 gallon portion of the above bead hydrogel was activated by heating for 2 hours under non-drying conditions in a steam atmosphere having a moisture content of about 67 percent relative humidity at a temperature of 220° F. The gel beads were then base exchanged continuously for 24 hours with a 2 weight percent ammonium chloride solution, the flow rate being controlled to change the solution once every hour. The exchange hydrogel was washed free of chloride ion, dried at 270° F. in air and calcined for 10 hours at 1000° F. in air.

EXAMPLE 13

The catalyst of this example showed that base exchange of the silica-zirconia hydrogel can be effectively carried out prior to the humidity activation step.

The catalyst was prepared in a manner similar to that of Example 12 using a 1 gallon portion of the bead hydrogel produced as in Example 12, except that the hydrogel was base exchanged with $NH_4Cl$ to replace zeolitic sodium in the hydrogel prior to the humidity activation.

EXAMPLE 14

The catalyst of this example was prepared by treating a 1 gallon portion of the bead hydrogel produced in Example 12 for 4 hours at 200° F. with a 1.5 percent by weight aqueous solution of sulfuric acid reducing the hydrogel pH to 3. The acid treated hydrogel was then activated in a steam atmosphere having a moisture content of about 67 percent relative humidity at a temperature of 220° F. for 2 hours. Following the activation treatment, the composite was base exchanged with a 2 weight percent aqueous solution of ammonium chloride continuously for 24 hours. The gel was then washed free of chloride ion, dried and calcined as in Example 1. The resultant gel product contained approximately 9.65 percent $ZrO_2$ and 90.35 percent $SiO_2$.

Cracking characteristics of the above catalysts of Examples 12–14 were determined upon subjecting each of the catalysts to the above described CAT-C test. To observe selectivity differences independent of the conversion level of the individual silica-zirconia catalyst samples, each catalyst is compared to a standard silica-alumina catalyst containing about 10 weight percent alumina and 90 weight percent silica, giving the same conversion as the appropriate silica-zirconia catalyst. The results for Examples 12–14 are set forth in Table III. In this comparison each of the catalysts was treated with 100 percent steam at atmospheric pressure for 20 hours at 1225° F. before the cracking test to bring the activity to a reproducible level.

*Table III*

| Example No | 12 | 13 | 14 |
|---|---|---|---|
| Conversion, vol. percent | 47.1 | 54.9 | 60.8 |
| 10 RVP gaso., vol. percent | 40.5 | 45.8 | 49.2 |
| Excess C₄'s, vol. percent | 8.3 | 11.2 | 12.4 |
| C₅+gasoline, vol. percent | 38.6 | 43.9 | 47.2 |
| Total C₄'s, vol. percent | 10.2 | 13.1 | 14.4 |
| Dry gas, wt. percent | 4.8 | 5.7 | 6.5 |
| Coke, wt. percent | 1.9 | 2.4 | 3.4 |
| Difference from SiO₂-Al₂O₃ at same conversion: | | | |
| 10 RVP, gaso., vol. percent | +3.6 | +4.6 | +4.7 |
| Excess C₄'s, vol. percent | −1.9 | −1.8 | −2.6 |
| C₅+gasoline, vol. percent | +3.5 | +4.1 | +4.4 |
| Total C₄'s, vol. percent | −1.7 | −1.4 | −2.2 |
| Dry gas, wt. percent | −1.2 | −1.3 | −1.3 |
| Coke, wt. percent | −0.8 | −1.3 | −1.3 |

The above data show that active and selective silica-zirconia cracking catalysts can be prepared in accordance with the method described herein wherein base exchange of the silica-zirconia composite is effected before or after the described activation treatment.

It will accordingly be understood that the above description is merely illustrative of preferred embodiments of the invention of which many variations may be made by those skilled in the art without departing from the spirit thereof.

We claim:

1. A process for preparing a catalytic composite of silica and zirconia which comprises reacting a water-soluble zirconium compound and an alkali metal silicate to effect formation of a hydrous oxide composite consisting essentially of silica and zirconia characterized by a pH in excess of 7.5 and a zirconia content, on a dry solids basis, of between about 2 and about 20 percent by weight, activating said composite by contact with a moist atmosphere under essentially non-drying conditions at a temperature within the approximate range of 170 to 220° F. and at substantially atmospheric pressure for a period of between about ½ hour and 8 hours and thereafter drying the activated composite.

2. A process for preparing a catalytic composite of silica and zirconia which comprises reacting a water-soluble zirconium compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, activating said hydrogel by contact with a moist atmosphere under essentially non-drying conditions at a temperature within the approximate range of 170 to 220° F. and at substantially atmospheric pressure for a period of between about ½ hour and 8 hours and thereafter drying the activated composite.

3. A process for preparing a catalytic composite of silica and zirconia which comprises reacting a water-soluble zirconium compound and an alkali metal silicate to effect formation of a gelable sol consisting essentially of silica and zirconia characterized by a pH in excess of 7.5 and a zirconia content, on a dry solids basis, of between about 5 and about 15 percent by weight, permitting the said sol to set forming a silica-zirconia hydrogel, reducing the pH of said hydrogel to below 7, activating the hydrogel of reduced pH by contact with a moist atmosphere under essentially non-drying conditions at a temperature within the approximate range of 170 to 220° F. and at substantially atmospheric pressure for a period of between about ½ hour and 8 hours, thereafter washing the hydrogel free of soluble matter, drying and calcining.

4. A process for preparing a catalytic composite of silica and zirconia which comprises reacting in aqueous solution, zirconium sulfate and sodium silicate to effect formation of a gelable sol consisting essentially of silica and zirconia characterized by a pH in excess of 7.5 but not greater than 11 and a zirconia content, on a dry solids basis, of between about 5 and about 15 percent by weight, permitting the said hydrosol to set forming a silica-zirconia hydrogel, activating the resulting hydrogel by contact with an atmosphere having a moisture content within the approximate range of 60 to 85 percent relative humidity under essentially non-drying conditions at a temperature within the approximate range of 170 to 220° F. and at substantially atmospheric pressure for a period of between about ½ hour and about 3 hours under conditions of substantially atmospheric pressure, thereafter washing the hydrogel free of soluble matter, drying and calcining.

5. A process for preparing a catalytic composite of silica and zirconia which comprises reacting a water-soluble zirconium compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, base exchanging zeolitic alkali metal from said hydrogel, activating the resulting hydrogel by contact with a moist atmosphere under essentially non-drying conditions at a temperature within the approximate range of 170 to 220° F. and at substantially atmospheric pressure for a period of between ½ hour and 8 hours, thereafter washing the hydrogel free of soluble matter, drying and calcining.

6. A process for preparing a catalytic composite of silica and zirconia which comprises reacting a water-soluble zirconium compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, activating said hydrogel by contact with a moist atmosphere under essentially non-drying conditions at a temperature within the approximate range of 170 to 220° F. and at substantially atmospheric pressure for a period of between about ½ hour and 8 hours, base exchanging zeolitic alkali metal from said hydrogel, thereafter washing the hydrogel free of soluble matter, drying and calcining.

7. A process for the conversion of hydrocarbons which comprises contacting the same at conversion conditions with a catalyst consisting essentially of silica and zirconia prepared by the process which comprises reacting a water-soluble zirconium compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, activating said hydrogel by contact with a moist atmosphere under essentially non-drying conditions at a temperature within the approximate range of 170 to 220° F. and at substantially atmospheric pressure for a period of between about ½ hour and 8 hours, thereafter washing the hydrogel free of soluble matter, drying and calcining.

8. A process for the conversion of hydrocarbons which comprises contacting the same at conversion conditions with a catalyst consisting essentially of silica and zirconia prepared by the process which comprises reacting a water-soluble compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, base exchanging zeolitic alkali metal from said hydrogel, activating the resulting hydrogel by contact with a moist atmosphere under essentially non-drying conditions at a temperature within the approximate range of 170 to 220° F. and at substantially atmospheric pressure for a period of between about ½ hour and 8 hours, thereafter washing the hydrogel free of soluble matter, drying and calcining.

9. A process for the conversion of hydrocarbons which comprises contacting the same at conversion conditions with a catalyst consisting essentially of silica and zirconia prepared by the process which comprises reacting a water-soluble compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, activating said hydrogel by contact with a moist atmosphere under essentially non-drying conditions at a temperature within the approximate range of 170 to 220° F. and at substantially atmospheric pressure for a period of between about ½ hour and 8 hours, base exchanging zeolitic alkali metal from said hydrogel, thereafter washing the hydrogel free of soluble matter, drying and calcining.

10. A process for the conversion of hydrocarbons which comprises contacting the same at conversion conditions with a catalyst consisting essentially of silica and zirconia prepared by the process which comprises reacting a water-soluble zirconium compound and an alkali metal silicate to effect formation of a gelable sol consisting essentially of silica and zirconia characterized by a pH in excess of 7.5 and a zirconia content, on a dry solids basis, of between about 5 and about 15 percent by weight, permitting the said sol to set forming a silica-zirconia hydrogel, reducing the pH of said hydrogel to below 7, activating the hydrogel of reduced pH by contact with a moist atmosphere under essentially non-drying conditions at a temperature within the approximate range of 170 to 220° F. and at substantially atmospheric pressure for a period of between about ½ hour and 8 hours, thereafter washing the hydrogel free of soluble matter, drying and calcining.

11. A process for the conversion of hydrocarbons which comprises contacting the same at conversion conditions with a catalyst consisting essentially of silica and zirconia prepared by the process which comprises reacting a water-soluble zirconium compound and an alkali metal silicate to effect formation of a gelable sol consisting essentially of silica and zirconia characterized by a pH in excess of 7.5 but not greater than 11 and a zirconia content, on a dry solids basis, of between about 5 and about 15 percent by weight, permitting the said hydrosol to set forming a silica-zirconia hydrogel, activating the resulting hydrogel by contact with an atmosphere having a moisture content within the approximate range of 60 to 85 percent relative humidity under essentially non-drying conditions at a temperature within the approximate range of 170 to 220° F. and at substantially atmospheric pressure for a period of between about ½ hour and about 3 hours under conditions of substantially atmospheric pressure, thereafter washing the hydrogel free of soluble matter, drying and calcining.

12. A hydrocarbon conversion catalyst consisting essentially of silica and zirconia having a zirconia content of between about 2 and about 20 percent by weight, prepared by reacting a water-soluble zirconium compound and an alkali metal silicate to effect formation of a hydrous oxide composite consisting essentially of silica and zirconia characterized by a pH in excess of 7.5 and a zirconia content, on a dry solids basis, of between about 2 and about 20 percent by weight, activating said composite by contacting with a moist atmosphere under essentially non-drying conditions at a temperature within the approximate range of 170 to 220° F. and at substantially atmospheric pressure for a period of between about ½ hour and 8 hours, thereafter washing the hydrogel free of soluble matter, drying and calcining.

13. A hydrocarbon conversion catalyst consisting essentially of silica and zirconia having a zirconia content of between about 2 and about 20 percent by weight, prepared by reacting a water-soluble zirconium compound and an alkali metal silicate to effect formation of a gelable sol consisting essentially of silica and zirconia characterized by a pH in excess of 7.5 and a zirconia content, on a dry solids basis, of between about 2 and about 20 percent by weight, permitting the said sol to set forming a silica-zirconia hydrogel, activating said hydrogel by contact with a moist atmosphere under essentially non-drying conditions at a temperature within the approximate range of 170 to 220° F. and at substantially atmospheric pressure for a period of between about ½ hour and 8 hours, thereafter washing the hydrogel free of soluble matter, drying and calcining.

References Cited by the Examiner

UNITED STATES PATENTS 2,982,719　5/61　Gilbert et al. _____ 208—120
3,015,620　1/62　Plank et al. _____ 208—119

ALPHONSO D. SULLIVAN, *Primary Examiner.*

UNITED STATES PATENT OFFICE
CERTIFICATE OF CORRECTION

Patent No. 3,193,493                                                            July 6, 1965

Jean M. Bourguet et al.

It is hereby certified that error appears in the above numbered patent requiring correction and that the said Letters Patent should read as corrected below.

Column 5, line 18, for "10/1" read -- 20/1 --; column 6, line 70, for "approximae" read -- approximate --; column 7, lines 62 and 63, for "specefic" read -- specific --; line 71, for "power" read -- powder --; column 8, lines 11 and 12, for "preperature" read -- precipitate was filtered and washed with water at room temperature --; columns 9 and 10, Table I, last column, line 15 thereof, for "80.0" read -- 89.0 --.

Signed and sealed this 18th day of January 1966.

(SEAL)
Attest:

ERNEST W. SWIDER                                     EDWARD J. BRENNER
Attesting Officer                                            Commissioner of Patents